A. B. Ely.
Bridle Bit.
N°. 88,021.            Patented Mar. 23, 1869.
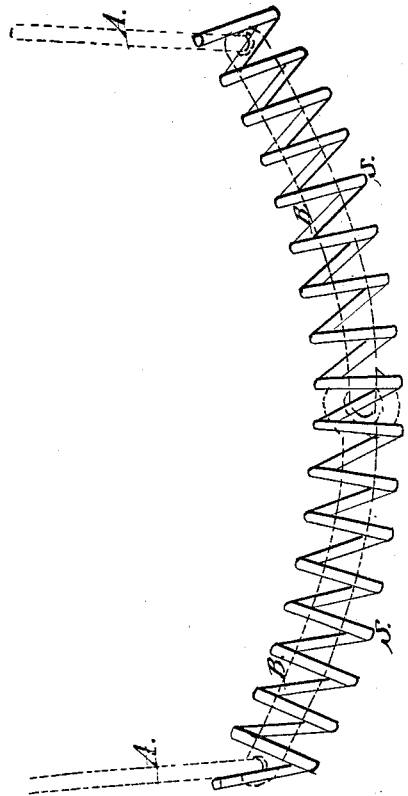
Witnesses:
John P. Jacobs
Inventor:
A. B. Ely

United States Patent Office.

ALFRED B. ELY, OF NEWTON, MASSACHUSETTS.

Letters Patent No. 88,021, dated March 23, 1869.

IMPROVED BRIDLE-BIT.

The Schedule referred to in these Letters Patent and making part of the same.

Be it known that I, ALFRED B. ELY, of Newton, in the State of Massachusetts, have invented a new and useful Improvement in Bridle-Bits, of which the following is a full description, in connection with the drawings.

Bits have heretofore been made where the bar has been wound with wire, for the purpose of what is called sawing the horse's mouth, and the bars of bits have been covered with leather and rubber.

My invention consists simply in the application and use of a spiral, or helical spring, of elastic wire, between the rings, or cheeks.

It is better to use a spring made of small wire, and, in that case, to have it surround a bar, or whatever may be used to connect the rings, and prevent them from pulling apart, which they might do if held only by the spring. But the spring may be made stout enough, so that the rings may be fastened directly to its ends, and thus the spring form the only bar or connection; or the reins may be fastened directly to the ends of the spring.

This bit the horse cannot bite upon, as upon a solid, rigid, unelastic substance, while it will conform to his mouth, and, if need be, it can be used effectually, by the sawing-process, to confuse the horse, or to hurt him so far as to bring him under control.

In the drawing—

The red lines B B indicate the bar of the bit, which may be of any form or material, stiff or flexible, whole or in sections.

S S is the helical, or coiled spring, and

A A are the rings.

The wire should not be wound tight together, but an interval should be left between the coils, to accomplish the end.

What I claim, is—

A bridle-bit, constructed as described.

In testimony whereof, I have hereunto subscribed my name.

ALFRED B. ELY.

Witnesses:
    CORNEL'S JACOBS,
    JOHN P. JACOBS.